United States Patent [19]

Escola Gallart et al.

[11] Patent Number: 5,279,842
[45] Date of Patent: Jan. 18, 1994

[54] CONFECTION FILLED GASIFIED CARAMEL AND PROCESS FOR OBTAINING THE SAME

[76] Inventors: Ramon Escola Gallart, C. Sebastian Altet, 6, 08190 Sant Cugat des Valles, Barcelona; Ramon Bayes Turull, C. Urgell, 249, 08036 Barcelona, both of Spain

[21] Appl. No.: 776,809

[22] Filed: Oct. 15, 1991

Related U.S. Application Data

[63] Continuation-in-part of Ser. No. 487,283, Mar. 2, 1990, abandoned.

[30] Foreign Application Priority Data

Mar. 20, 1989 [ES] Spain .................................. 8900996

[51] Int. Cl.⁵ ............................................. A23G 3/32
[52] U.S. Cl. .................................. 426/282; 426/91; 426/103; 426/104; 426/134; 426/780; 426/421; 426/660
[58] Field of Search ............... 426/91, 103, 104, 138, 426/660, 572, 279, 280, 282, 134, 421, 515; 425/126.2; 222/185, 386

[56] References Cited

U.S. PATENT DOCUMENTS

| | | | |
|---|---|---|---|
| 2,651,573 | 9/1953 | Leach | 426/134 |
| 2,752,920 | 7/1956 | Kurkjian | 222/386 |
| 3,666,388 | 5/1972 | Oberwelland et al. | 426/279 |
| 4,262,029 | 4/1981 | Kleiner et al. | 426/572 |
| 4,717,573 | 1/1988 | Aquarius | 426/91 |
| 4,837,039 | 6/1989 | Escola Gallart et al. | 426/572 |
| 4,902,519 | 2/1990 | Ream et al. | 426/91 |

FOREIGN PATENT DOCUMENTS

911264 10/1972 Canada .................. 425/126.2

Primary Examiner—Steven Weinstein
Assistant Examiner—Anthony Weier
Attorney, Agent, or Firm—Steinberg & Raskin

[57] ABSTRACT

A process for obtaining a confection filled with gasified caramel in which the initial caramel mass is at a temperature between about 90 and 150° C. and at a degree of moisture below equilibrium moisture of the resulting gasified caramel. After adding essences and/or colorants and depositing the mass in molds (14, 15), cavities of a volume of 0.2 to 20 ml are punched (17) in the two parts of the caramel mass disposed in the molds. The molds are then cooled to a temperature below 50° C., with chips of gasified caramel alone or mixed with chewing gum being placed into the cavities formed in the molds. Before the two complementary molds are joined (20), an adhesive (19) is applied to the parts of the caramel mass disposed in the molds. The caramel (23) is then removed (22) from the molds. The caramel (23) which has been filled with gasified caramel either alone or mixed with chewing gum, may be provided with a stick (24). The gasified caramel is protected from moisture, thereby simplifying the wrapping thereof.

23 Claims, 6 Drawing Sheets

CONFECTION FILLED GASIFIED CARAMEL AND PROCESS FOR OBTAINING THE SAME

BACKGROUND OF THE INVENTION

The present application is a continuation-in-part of U.S. application Ser. No. 07/487,283, filed Mar. 2, 1990 now abandoned.

The present invention relates to a confection or caramel filled, in turn, with gasified caramel, and also to a process for obtaining such a confection or caramel thus-filled with gasified caramel.

Numerous patents have been published on production of caramels, chewing gum, and chocolates in which an inert gas has been introduced during the liquid or pasty state thereof, whereby products of lower density and therefore with a lower cost per volume or with different sensations, are obtained. However, in none of these patents is the gas retained inside the mass, which is the point of distinction of a "pop" caramel.

The first patent which appeared on introduction of a gas in a mixture of melted sugars, which gas when left to cool would remain occluded therein and would pop when released, was U.S. Pat. No. 3,012,893, filed Jan. 6, 1959. In May 21, 1979, the same inventors of the present application cited for the first time the importance of diameter of bubbles of occluded gas (Spanish Patent No. 480,775).

A gasified caramel is a mixture of various sugars in which, in a semi-liquid or pasty state, an inert gas under pressure has been incorporated. The chips of caramel are highly hygroscopic, so that the mere contact thereof with surrounding atmosphere causes the caramel to absorb moisture and to break down, because the caramel is compressed and the moisture absorbed is sufficient to release the occluded gas. This is why the caramels must have an absolute barrier against moisture when packed.

By means of the patents on gasified caramel noted above, a product with a very varied granulation is obtained, ranging from about 0.001 mm to 10 mm or even larger pieces. This product thus-obtained is screened to make use of the pieces between 0.5 and 4.5 mm. Presently, this product is packed in unit envelopes containing 4 to 10 grams per bag. A child's sensation is very short, as a child consumes the contents of a bag in a very short time and discards the same. This is one of the shortcomings of the product, as its packing is an aluminum foil of 8 or 9 microns in thickness and a thermoweldable layer to obtain an absolute barrier to moisture. This makes the end product more expensive without any benefit for a child consuming the product who must pay a high price for the wrapper that this product requires.

At present, caramels are found on the market which are provided with sticks, are filled with various liquid products, solids, effervescent powders, etc. The manner of adding these products is by way of a pressure pump which introduces the product to be filled into a strip of caramel before passing through a size and a stamping press. By this method, it is impossible to introduce chips of gasified caramel, since the pressure at which the pump operates causes the chips of gasified chemical to break because of their great fragility, thus converting the chips to powder. Thus, the chips loose their "popping" sensation when placed in the mouth, since the pieces smaller than 1 mm give a weak "hissing sensation" but not one of popping.

SUMMARY OF THIS INVENTION

Accordingly, it is an object of the present invention to improve over the drawbacks described above, in preparing a confection provided with gasified caramel, notably in the interior thereof.

This and other objects of the present invention which will become apparent herein, are attained by the present invention which is directed to a process comprising the steps of preparing an initial caramel mass at a temperature between about 90 and 150° C. and at a degree of moisture lower than equilibrium moisture of said gasified caramel; including in said mass at least one additive which is an essence or colorant; proportioning two parts of said caramel mass and putting said two parts in complementary hollow molds; forming cavities of a volume of 0.2 to 20 ml in said two parts of said caramel mass disposed in said complementary molds such that transparent shells are produced from said caramel mass; cooling said molds to a temperature below about 50° C., and preferably from about 30° C. to about 38° C.; thereafter, placing chips of gasified caramel alone or mixed with chewing gum and with a grain size between about 0.2 and 10 mm and in a quantity of about 0.2 to 15 grams in said cavities formed in said two parts; applying an adhesive to said two parts of said caramel mass disposed in said molds; joining said two complementary molds together to produce union of said two parts of said caramel mass; and removing a thus-obtained caramel from said molds.

The present invention is directed to molding of hollow forms of a conventional caramel mass obtained by the process described above, and into which chips of gasified caramel or gasified caramel mixture with chewing gum, are deposited. More specifically, the present invention relates to preparation of a caramel with or without a stick, in hollow form and filled with chips of caramel or caramel mixed with chewing gum, in a manner such that the caramel or confection suffers no damage and preserves all of the characteristics of "popping" during the manufacturing process, and furthermore which is stable without need to use a special packaging.

The process of the present invention is constituted by preparing a caramel mass according to the "conventional" methods described above, but with preference being given to a mass whose dropping point is as low as possible, in order to thus cool the mass as quickly as possible, resulting in increased production and savings of energy. This caramel mass has a temperature of about 135° C. and a moisture of approximately 2% (KF).

After the caramel mass has been obtained, sticks are introduced into the mold automatically. The caramel mass is proportioned over molds by means of a system which, in the confection industry, is known as "depositing". These molds are constituted by two hollow parts, into one of which a stick may be inserted. The two pieces can be filled with different colors and flavors.

These now-molded and punched pieces must be cooled to a temperature of about 30° C. to 38° C. by passage of the mold chain through a cold tunnel. For this reason, it is desirable that the initial mass for making the deposit of the caramel has a temperature as low as possible. Final temperature higher than 38° C. would break down the gasified caramel. Mixtures of sugars whose deposition temperature is low can be used, allowing the molds pieces of caramel to be cooled faster and therefore increasing the production.

Once the pieces are molded and at a temperature of 30° C. to 38° C., the chips of gasified caramel, either alone or mixed with chewing gum, are added inside the cavity of the thus-molded piece. Thereafter, the two pieces are joined, whereby the gasified caramel remains inside the confection and is well-protected from the surrounding moisture, since there is a layer of caramel which insulates the same.

The place of union or joint of the two molded pieces is sealed by a mass of molten caramel or a product suitable for consumption, and which fulfills conditions of providing a moisture barrier and is stable over time, such as, e.g. waxes, sorbitol, lacquers, etc. To better insure hermeticity, it is desirable to form a ring of caramel at the weld point. To finish the process, at the end the conveyor belt reverses, the molds open, and the caramels are caused to fall onto another conveyor belt.

With the present invention, important advantages are achieved, including the following:

(1) The use of aluminum foil wrapping which is expensive, is avoided, and as the caramel mass itself with the characteristics which will be set forth in greater detail below provides a sufficient barrier to moisture for the chips of gasified caramel that are situated inside the piece, so that the end product can be wrapped in any paper;

(2) A new product has been obtained which is presently unknown, e.g. to a child, since a child is only presently aware of a gasified caramel containing only small chips of caramel with "pops" inside a small sack; and (3) A transparent caramel can be obtained, so that an individual can actually see chips of gasified caramel inside the confection.

In the process of the present invention, the initial caramel mass preferably has a dropping point between about 40 and 150° C., while the degree of moisture of the caramel mass is preferably between about 0.5 and 6%, most preferably between about 1.5 and 3.5%.

The gasified caramel is very hygroscopic and tends to absorb ambient moisture, since in the gasification process, the saccharose is hydrolyzed and transformed into fructose and glucose. Fructose is a very hygroscopic substance. Accordingly, it has been discovered that if the moisture of the caramel mass shells is too high, the moisture will pass to the gasified caramel, causing the sugar in the gasified caramel to be solved and the gas to be released.

It has been discovered that when the moisture of the caramel mass is maintained between about 0.5% to about 6%, the product is optimized. A moisture level higher than 6% has been found to cause the caramel mass of the shells to become soft and not retain the gas in the gasified caramel. Likewise, for a moisture degree lower than 0.5%, the caramel mass shell burns and a part of the sugar carbonizes, the caramel thus substantially losing its organoleptic properties.

The two complementary molds may be alike, or they may be different from one another. Furthermore, the essences and colorants which are added to the caramel mass in the two different parts disposed in the complementary molds may be alike, or alternatively different essences and colorants may be added in each individual part of the caramel mass from the other part.

The temperature to which the molds are cooled after the caramel mass has been deposited, is preferably between about 30 and 38° C., while the volume of the cavities punched in each mold is preferably between about 1.5 and 4.0 ml.

The aforementioned step of cooling the mass to a temperature in the range between from about 30° C. to about 38° C. is an important aspect of the present invention. Higher temperatures used in the prior art for manufacturing shells not only damage the gasified caramel but also reduce the gas present in the caramel, resulting in a reduction of the "popping" sensation. It has been discovered that the preferred temperature range provides an optimum "popping" sensation when placed in a subject's mouth, and that at temperatures over 38° C., the gasified caramel does not provide the desired "popping" sensation and the caramel mass of the shells do not retain the gas inside in an acceptable manner. The lower limit of the temperature range of the present invention is dictated mainly by economic factors, a temperature lower than about 30° C. entailing the use of too long and too expensive a cooling tunnel.

Grain size of the molten caramel placed in the thus-punched cavity is preferably between about 0.5 and 4.5 mm, while quantity of this caramel that is placed inside the cavities is preferably about 1 to 3 grams. Furthermore, walls of the outer caramel mass in which the cavities have been punched are preferably between about 2 and 4 mm thick. In particular, the walls of the outer caramel are thicker in the part where a stick might be inserted.

BRIEF DESCRIPTION OF THE DRAWINGS

For better understanding of what has been set forth herein, reference will be made to the accompanying drawings in which, schematically and by way of non-limiting examples, practical cases of the present invention are represented. It is not at all intended to limit the scope of the present invention herein to the specific embodiments illustrated in the drawings. More specifically, in the drawings.

DESCRIPTION OF THE PREFERRED EMBODIMENTS

Figure 1:
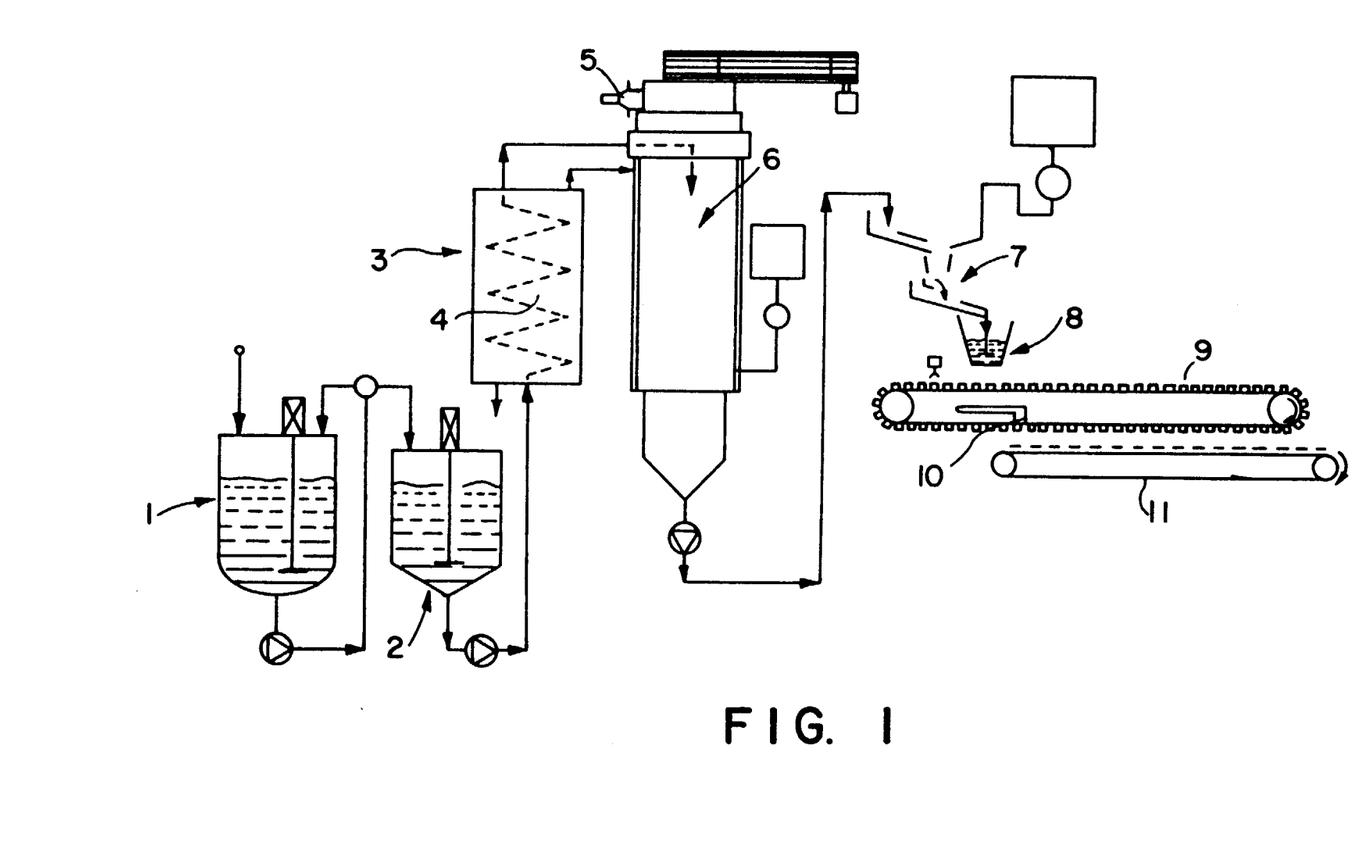
FIG. 1 is a schematic diagram of a process for preparing a confection or caramel mass of a conventional type.

The caramel mass of the present invention may be prepared according to the conventional method illustrated in FIG. 1. More specifically, the preparation is essentially constituted by mixing sugars and water in a reactor 1 with slight heating; making a predissolution in a reactor 2 by heating and agitation; heating to a high temperature in a boiling chamber 3 provided with a coil 4; making a pre-vacuum b means of rotors 5, with water being extracted and the caramel becoming more concentrated; and drying the caramel mass to approximately 2% moisture in a vacuum chamber 6.

Finally, the proportioning is accomplished by adding at 7 essences and colorants, with the mass being agitated at 8, followed by passing to the molding on a first conveyor belt 9, upon which removal from the mold is carried out at 10, and the caramel removed from the mold is passed to another conveyor belt 11.

Figure 2:
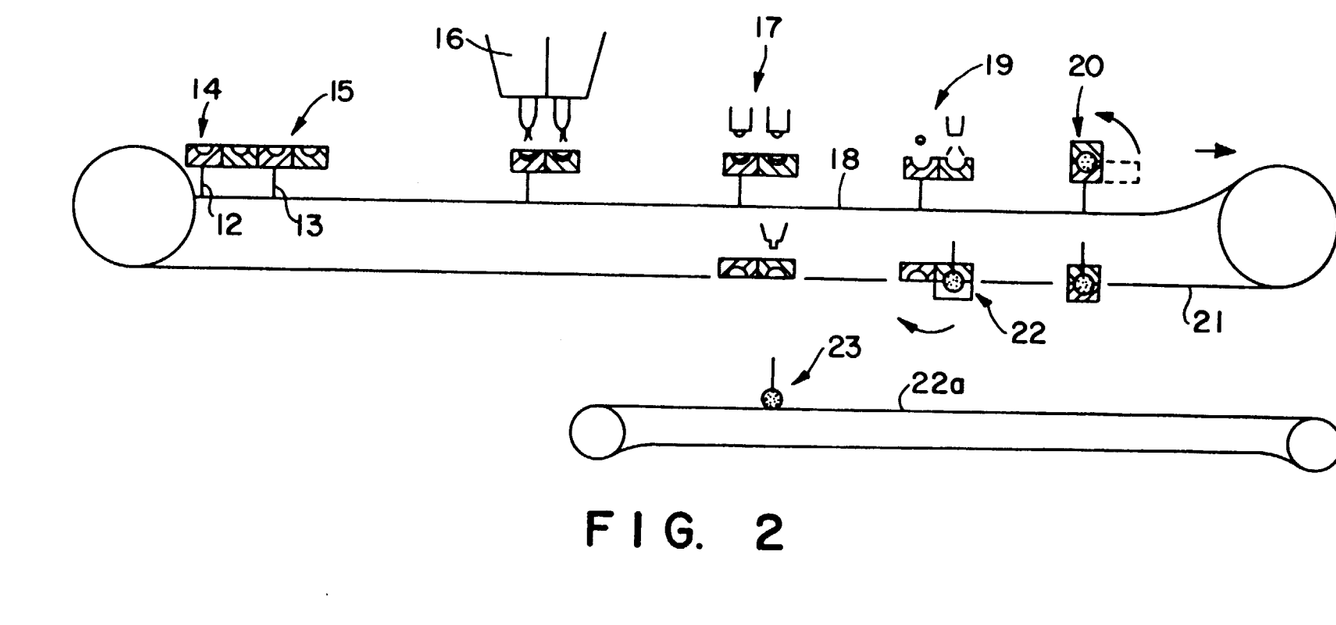
FIG. 2 is a schematic diagram of the process of the present invention herein.

Automatic placing of sticks 12, 13 in the molds 14, 15 can be seen in FIG. 2. The caramel mass is proportioned 16 over the molds by a system which, at the confectionery industry, is known as "depositing". Thereafter, the cavities are preferably punched without pressure, e.g. pushed, in the caramel at 17. In contrast, in prior art methods of forming the shells, the cavities are punched using pressure.

Figure 3:
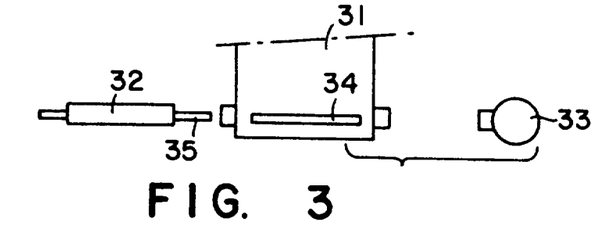
FIGS. 3-5 are schematic diagrams of the stick feeding device of the present invention.
Figure 4:
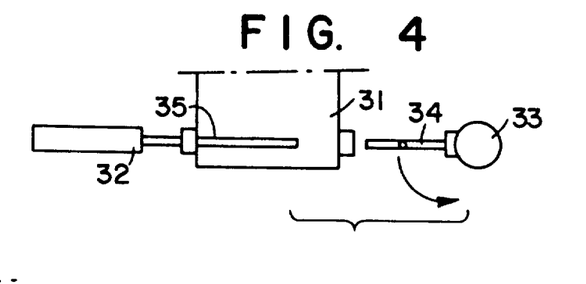
Figure 5:
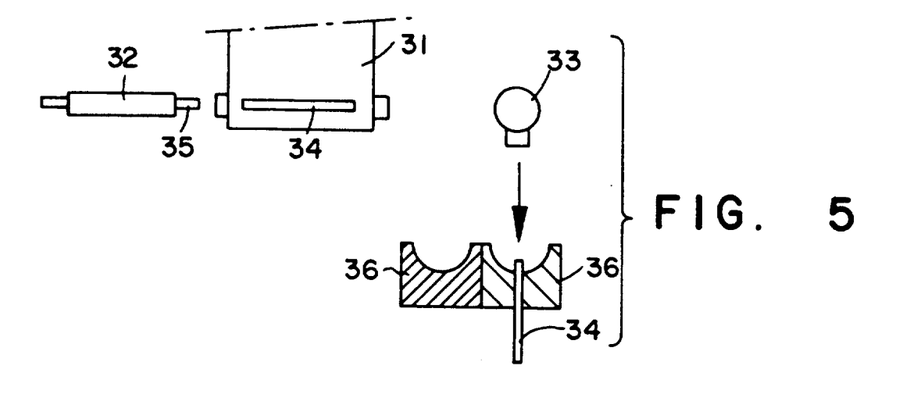

In a preferred embodiment, the automatic placing of sticks 12, 13 into the caramel in the molds 14, 15 is accomplished via the novel stick feeding device depicted in FIGS. 3-5. The device essentially comprises three members; a stick hopper 31, a pushing ram 32, and a stick clamp 33.

Turning now to FIGS. 3-5, the sticks 34 are shown stored in the stick hopper 31 in order to be supplied to the confection. The pushing ram pushes every stick 34 out from the stick hopper 31 towards the stick clamp 33. The stick clamp 33 picks up the stick, turns about 90°, and drops it into the lower half mold where the confection shell is formed.

FIG. 3 shows the stick 34 is shown inside the hopper 31 and the pushing ram 32 before the stick 34 is pushed out.

FIG. 4 shows the stick 34 being pushed by the ram rod 35 and picked up by the stick clamp 33.

FIG. 5 shows the clamp 33 after its 90° turn and after having dropped the stick 34 into the half mold 36. FIG. 5 also shows a fresh stick 35 inside the hopper 31 and the pushing ram 32 in the same rest position as depicted in FIG. 3.

Most preferably, the caramel (sugar) mass forming the shells essentially transparent. Accordingly, it is especially preferred that the mass is not compressed, i.e., punched under pressure, because the sugar mass will thereby crystallize and become opaque. The sugar mass which is to be pushed into the molds is therefore preferably in a substantially liquid state in order to facilitate movement of the mass without pressure. Preferably, the mass is moved at a temperature from about 90° C. to about 150° C., and most preferably at a temperature of about 135° C.

These now-molded and punched pieces of caramel must be cooled to a temperature of about 30° C. to 38° C. by passage of the mold chain 18 through a cold tunnel. After the pieces are molded at a temperature of about 30° C. to 38° C., the chips of gasified caramel, either alone or mixed with chewing gum, are added into the cavity of the molded pieces. Then, an adhesive is applied at 10 to the two parts of the caramel mass in the molds 14 and 15.

Later, the two parts are joined at 20, so that the gasified caramel remains inside the confection and is well-protected from the surrounding moisture, since there is a layer of caramel which insulates the same. The place of union or joint of the two parts is sealed with a mass of molten caramel or a product suitable for consumption, and which fulfills the conditions of providing a moisture barrier. To finish, at the end the belt reverses at 21, the molds open at 22, and the thus-molded caramels are caused to fall onto a conveyor belt 22a.

Figure 6:
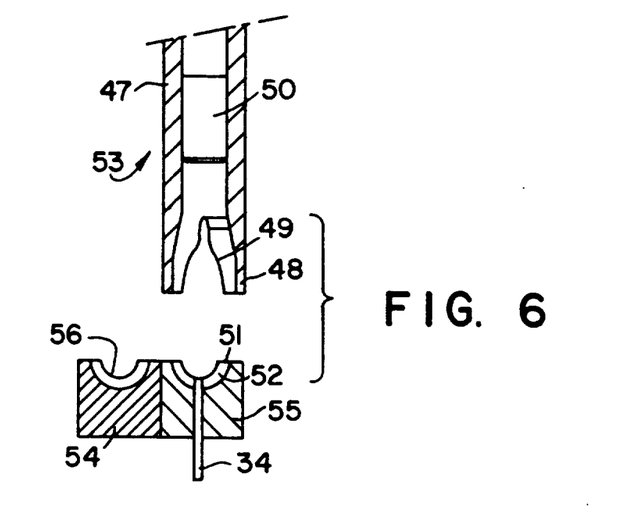
FIGS. 6-9 are schematic diagrams of the device for applying adhesive of the present invention.
Figure 7:
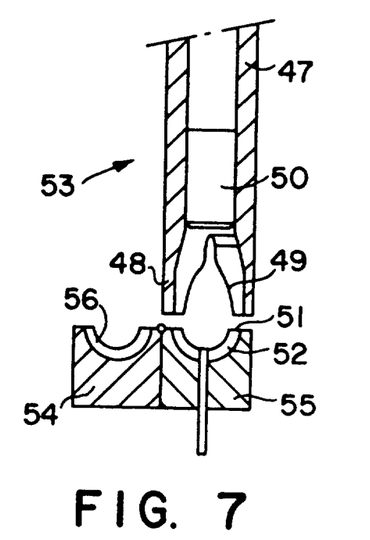
Figure 8:
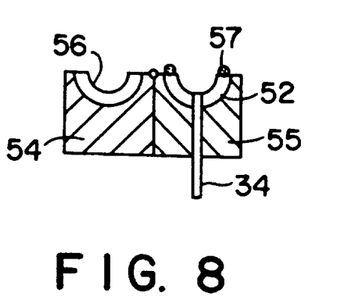

Most preferably, a novel device is used for applying the adhesive for joining the two parts onto the flat surface of the lower shell. Turning now to FIGS. 6–8, the device for applying adhesive essentially comprises the following parts: a tube 47 with an enlarged output 48; a conical member 49 which, together with the enlarged output 48, defines a tubular passageway; and a piston 50 which pushes the adhesive toward the enlarged outlet 48. The adhesive is pushed toward the device outlet and forms a ring on the flat surface 51 of the lower shell 52.

FIG. 6 shows the device for applying adhesive 53 before the adhesive is applied. An upper shell 56 and a lower shell 52 are depicted inside the respective upper half mold 54 and lower half mold 55. The lower shell 52 has a stick in it.

FIG. 7 shows the device 53 when the adhesive is being applied on the flat surface 51 of the lower shell 52. In one embodiment, the enlarged output has a shape substantially corresponding to the shape of the lower half mold.

FIG. 8 shows the mold where the ring-shaped adhesive 57 has been applied on the flat surface 51 of the lower shell 52.

Figure 9:
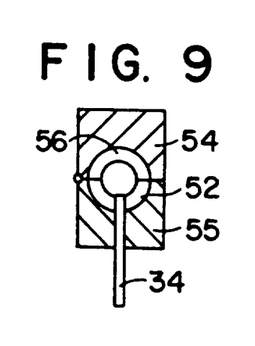

FIG. 9 shows the mold already closed where the upper 56 and the lower 52 shells are in contact and being stuck together.

Figure 10:
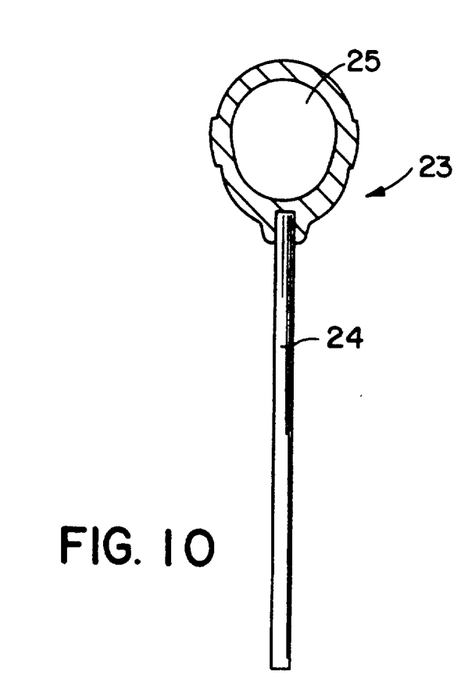
FIG. 10 illustrates an embodiment of a caramel prepared in accordance with the present invention.

FIG. 10 illustrates a caramel 23 provided with a stick 24 and with an inner cavity 25 in accordance with the present invention. Gasified caramel is present in the inner cavity, 25 of the confection or caramels illustrated in FIG. 10.

The present invention will be described in greater detail by way of the following examples:

EXAMPLE 1

In a "Caramix" installation with "Tripple Rotocooker" of the TER BRAAK Company, a saccharose:-glucose mixture was prepared in a proportion of 70:30, obtaining a caramel syrup with a final moisture of 2% and a final temperature of 135° C. Essence and colorant were added. The resulting product was deposited by the method which, in the confectionery industry, is termed "pouring" or "depositing" on a suitably-cooled belt which contains a mold with two hemispherical and hollow parts, and in one of which a stick has been introduced previously if desired, as illustrated in the process of FIG. 2 in the present case. The introduction of the stick as well as the geometrical form of the mold are entirely discretional.

The caramel was then pushed inside the mold, to leave a hollow part of a capacity of about 3.8 ml. The caramel mass was then cooled to a temperature of approximately 38° C. by passage of the conveyor chain through a cooling tunnel. Then, two grams of caramel chips were added. The two caramel parts were joined and strapped together with a mixture of molten fructose:sorbitol in a proportion of 90:10, and with the very same mixture forming a ring around the resulting joint. There was a mechanism for stripping the piece at the end of the chain, said stripped piece passing to another conveyor belt (see FIG. 2).

EXAMPLE 2

Initially, a reactor was prepared with molten sorbitol at a temperature of 110° C., with the remaining preparation steps being followed as outlined in Example 1.

EXAMPLE 3

A mixture of fructose:sorbitol in a proportion of 90:10 was initially prepared, with the steps then being followed in accordance with the procedure described in Example 1 above.

ANALYSIS OF "POPPING" SENSATION

The "popping" sensation of a single lot of gasified caramels differs from person to person, and for this reason an analytical system has been perfected for checking the quality and intensity of the pops. Thus, the testing of the gasified caramel is simplified and improved, with the results being objective, simple, and reliable.

The "pop" is produced by the breaking of the caramel film caused by the pressure of the occluded gas, giving a "sound", the term "sound" meaning whatever might produce sensations inherent in the sense of hearing. The origin of these sensations may be described as a succession of variations of the atmospheric pressure which propagate through the air and which, upon reaching the tympanum of the ar, cause the tympanous to vibrate. The vibrations of the tympanum are transmitted, transformed, and processed by the ear until they reach the cortex, in which the sound sensation occurs in the form of bioelectric energy.

The improvement of the analytical system of the "pops" of the gasified caramel has been accomplished by adapting the analytical system to the reality of the human consumption, since it is not equivalent to "hear" the pops of a gasified caramel that is put in a glass of water, and to "hear" the pops of a gasified caramel that is placed in the mount of an individual, because the medium of transmission in the latter case is much more direct, since the "pop" produced to the mouth (which acts as a resonator) is transmitted directly from the mouth to the middle ear through the Eustachian tube which connects the throat with the middle ear; in other words, the person does not "hear" the pop thorough the outer ear in the latter case. However, persons standing before an individual consuming the gasified caramel, on the contrary, do "hear" the pop through their outer ears.

For this reason, an analytical system has been developed to be arranged as closely as possible to the intensity and quantity of when the gasified caramel is placed in that individual's mouth. On the other hand, this improved testing system allows recording of pops graphically both as to quantity and as to intensity, which has been found to be fundamental for the research study.

The main characteristics of this testing system are as follows:

APPARATUS

Power Supply Model ZG 0254, supplied by BRUEL KJAER;
Hydrophone, Model 8103, supplied by BRUEL KJAER;
Precision Sonometer Model 2235, supplied by BRUEL KJAER;
Magnetic Agitator Model A-06, Brand SBS, supplied by

SELECTA

Recorder Model OMNISCRIBE Serial D-500, Brand BAUSCH and LOMB, supplied by CRISON, S.A.;
Precipitation vessel of 400 cc.;
Water temperature = 15° C.

METHOD

The quantifying of quantity and intensity of the pops produced by a determined and constant quantity of gasified caramel is involved in the present method. A teflon-coated magnet is placed in a vessel and the hydrophone is submerged. The magnetic agitator is set in motion (setting at 1 on a speed scale from 0 to 10), thus obtaining a sufficient agitation which is not detected by the hydrophone. The hydrophone is connected to the sonometer by a cable. The sonometer always measures under the same conditions.

Figure 11:
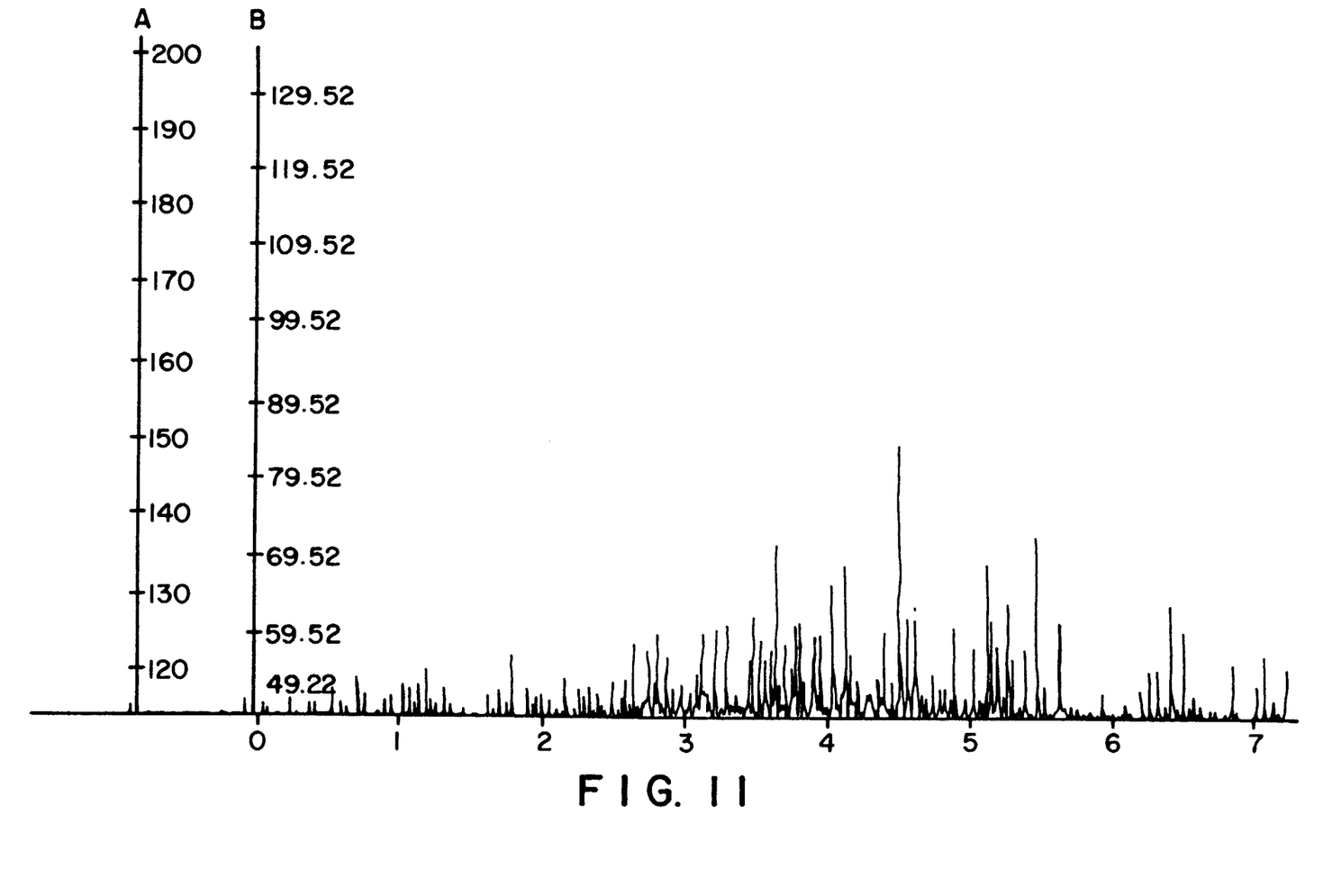
FIGS. 11 and 12 are graphs illustrating intensity of sound in decibels along ordinates thereof of the "opts" in two variants of underwater transmission and transmission in air respectively, of caramels or confection prepared in accordance with the present invention herein.
Figure 12:
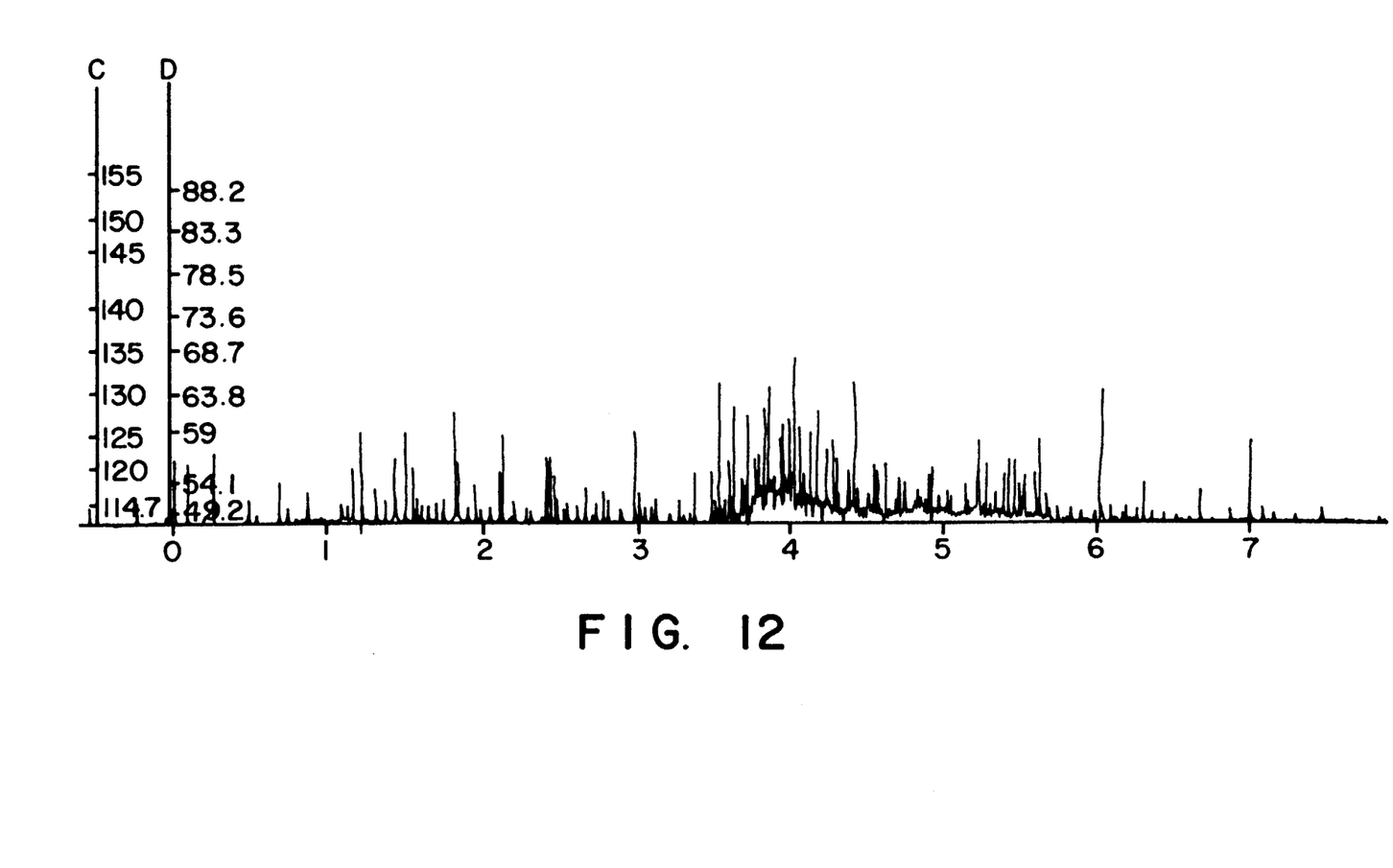

The pops of the gasified caramel that are produced in the container of water are detected by the hydrophone, which sends the detected pops to the sonometer, and then to a recorder, whereby a graph of the pops both as to quantity and as to intensity is obtained (please see FIGS. 11 and 12).

In FIGS. 11 and 12, the abscissa denote time in minutes and the ordinates denote two scales in dB, scales A and C representing underwater transmission and referred to 20 $\mu$P (micropascals), and scale B and D (representing transmission in air. The speed of the recorder is 5 cm/min or 2.5 cm/min. It is desirable to calibrate the equipment daily, so as to eliminate possible distortions of the results.

RESULTS

Graphs have been obtained with different pops which can be graduated in underwater transmission and in transmission in air. Different results are seen where each pop of gasified caramel is represented by a peak, and the intensity being represented by the height (FIGS. 11 and 12). These graphs represent the sensation of popping that a consumer of the caramel or confection filled with the gasified caramel, will have. At first, the popping sensation is practically nil, since only the outer part of the caramel or confection dissolves which corresponds to a conventional caramel structure, this outer part having only a protective function. After this outer part has dissolved, the pops begin, which become ever greater until the chips of gasified caramel are fully consumed or depleted. All this has permitted a more detailed study of each of the different elements that can affect the quality of the end product.

The preceding description of the present invention is merely exemplary, and is not intended to limit the scope thereof in any way.

What is claimed is:

1. The method for obtaining a confection filled with gasified caramel, comprising the steps of
    preparing an initial caramel mass at a temperature between about 90° C. and 150° C. and at a degree of moisture lower than equilibrium moisture of said gasified caramel;
    including in said caramel mass at least one additive which is an essence or colorant;
    proportioning said caramel mass into two parts which are in a substantially liquid state;
    pouring said heated two parts of said caramel mass in two complementary hollow molds such that said two parts of said caramel mass are deposited directly into said two complementary molds;
    pushing said two parts of said caramel mass to form cavities each having a volume of 0.2 to 20 ml in said two parts of said caramel mass disposed in said two complementary molds, said pushing step being performed substantially without applying pressure on said caramel mass such that transparent shells are produced;

cooling said molds to a temperature from about 30° C. to about 38° C.;

dropping chips of gasified caramel alone or mixed with chewing gum and with a grain size between about 0.2 and 10 mm and in a quantity of about 0.1 to 15 grams directly into at least one of said cavities of said two parts;

applying an adhesive to said two parts of said caramel mass disposed in said two complementary molds; and joining said two complementary molds together to produce union of said two parts of said caramel from said molds such that a confection is formed.

2. The method of claim 1, comprising the additional step of inserting a stick in one of said two complementary hollow molds prior to depositing said two parts of said caramel mass in said two complementary hollow molds such that a portion of the stick is external to the confection.

3. The method of claim 1, comprising the additional steps of sealing a zone of union of said two parts by means of a mass of molten caramel or a product suitable for consumption and removing the confection comprising gasified caramel from said molds.

4. The method of claim 1, wherein said initial caramel mass has a dropping point between about 40 and 150° C.

5. The method according to claim 1, wherein said degree of moisture of said caramel mass is between about 0.5 and 6%.

6. The method according to claim 5, wherein said degree of moisture of said caramel mass is between about 1.5 and 3.5%.

7. The method of claim 1, wherein said two complementary molds are alike.

8. The method of claim 1, wherein said two complementary molds are shaped differently from one another.

9. The method of claim 1, comprising the additional step of adding the essences and colorants to said two parts disposed in said two complementary molds.

10. The method of claim 1, comprising the additional step of adding different compounds comprising essences and colorants to each of said two parts of said caramel mass disposed in said two complementary molds.

11. The method of claim 1, therein said temperature to which said molds are cooled after said caramel mass has been deposited therewithin, is between about 30 and 38° C.

12. The method of claim 1, wherein said volume of said cavities pushed in each mold is between about 1.5 and 4.0 ml.

13. The method of claim 1, wherein said grain size of said chips of gasified caramel placed in each of said pushed cavities is between about 0.5 and 4.5 mm.

14. The method of claim 1, wherein quantity of the caramel that is placed in each of said cavities is about 1 to 3 grams.

15. The method of claim 1, wherein the thickness of the walls of said carmel mass after said cavities have been pushed therewithin are between about 2 and 4 mm thick.

16. The method according to claim 2, wherein the walls of said caramel mass after said cavities have been pushed therewithin are thicker in a part of said caramel mass where said stick is inserted.

17. The method of claim 2, wherein said step of inserting said stick comprises storing sticks in a hopper in order to be supplied to said two complementary molds, pushing said stick out from said hopper toward a stick clamp using a pushing ram, using said stick clamp to grasp said stick and move said stick from said hopper and to a location in proximity to a lower one of said two complementary molds, and releasing said stick from said stick clamp such that said stick is dropped into said lower complementary mold.

18. The method of claim 3, wherein said zone of union of said two parts is sealed by pushing adhesive through a tublar passageway to a first end of said tubular passageway via a piston, providing said first end of said tubular passageway with an enlarged output region having a shaped substantially corresponding to the shape of a lower one of said two complementary molds, arranging said first end of said tubular passageway in promixity to said lower one of said two complementary molds such that said adhesive is applied from said tubular passageway onto a flat surface of said mass in said lower complementary mold, and closing said mold such that said adhesive seals said mass in said lower complementary mold to said mass in an upper one of said two complementary molds in said zone of union.

19. The process of claim 1, further comprising the step of orienting said two complementary molds before said gasified caramel chips are placed therein such that an open side of said two complementary molds faces upward.

20. A confection comprising two transparent caramel shells united together with adhesive which are filled therein with gasified caramel, obtained in a method comprising the steps of preparing an initial caramel mass at a temperature between about 90° C. and 150° C. and at a degree of moisture lower than equilibrium moisture of said gasified caramel;

including in said caramel mass at least one additive which is an essence or colorant;

proportioning said caramel mass into two parts in a substantially liquid state;

pouring said heated two parts of said caramel mass in two complementary hollow molds such that said two parts of said caramel mass are deposited directly into said two complementary molds, pushing said two substantially liquid parts of said caramel mass to form cavities each having a volume of 0.2 to 20 ml in said two parts of said caramel mass disposed in said two complementary molds, said pushing step being performed substantially without applying pressure such that transparent shells are produced;

cooling said molds to a temperature from about 30° C. to about 38° C.; and thereafter dropping chips of gasified caramel alone or mixed with chewing gum and with a grain size between about 0.2 and 10 mm and in a quantity of about 0.2 to 15 grams directly into at least one of said cavities of said two parts;

applying an adhesive to said two parts of said caramel mass disposed in said molds;

joining said two complementary molds together to produce union of said two parts of said caramel mass; and removing the confection comprising gasified caramel from said molds.

21. The confection of claim 20, wherein one of said two parts of said caramel mass is provided with a stick, a portion of the stick being arranged external to the confection.

22. The confection of claim 21, wherein the confection is obtained in the method further comprising the steps of storing sticks in a hopper in order to be supplied to said two complementary molds, pushing said stick out from said hopper toward a stick clamp using a pushing ram, using said stick clamp to grasp said stick and move said stick from said hopper and to a location in proximity to a lower one of said two complementary molds such that said stick is inserted into said lower complementary mold prior to said caramel mass being deposited in said lower complementary mold, and releasing said stick from said stick clamp such that said stick is dropped into said lower complementary mold.

23. The confection of claim 21, wherein said zone of union of said two parts is sealed by pushing adhesive through a tubular passageway to a first end of said tubular passageway via a piston, and the confection is obtained in the method further comprising the steps of providing said first end of said tubular passageway with an enlarged output region having a shaped substantially corresponding to the shape of a lower one of said two complementary molds, arranging said first end of said tubular passageway in proximity to said lower one of said two complementary molds such that said adhesive is applied from said tubular passageway onto a flat surface of said caramel mass in said lower complementary molds, and closing said mold such that said adhesive seals said caramel mass in said lower complementary mold to said caramel mass in an upper one of said two complementary molds in said zone of union.

* * * * *